(12) United States Patent
Van Der Werf et al.

(10) Patent No.: US 6,676,861 B1
(45) Date of Patent: Jan. 13, 2004

(54) METHOD FOR MANUFACTURING A CORD FOR WELDING FLOOR COVERINGS

(75) Inventors: Antonie Van Der Werf, Krommenie (NL); Machteld Van Der Burgt, Haarlem (NL)

(73) Assignee: Forbo International S.A., Eglisau (CH)

( * ) Notice: Subject to any disclaimer, the term of this patent is extended or adjusted under 35 U.S.C. 154(b) by 0 days.

(21) Appl. No.: 09/830,924

(22) PCT Filed: Oct. 28, 1999

(86) PCT No.: PCT/EP99/08313

§ 371 (c)(1), (2), (4) Date: Oct. 1, 2001

(87) PCT Pub. No.: WO00/26004

PCT Pub. Date: May 11, 2000

(30) Foreign Application Priority Data

Nov. 3, 1998 (NL) .............................................. 1010455

(51) Int. Cl.[7] .......................... B29C 41/22; B29C 35/16
(52) U.S. Cl. ............................ 264/28; 264/73; 264/160
(58) Field of Search ............................... 264/28, 73–77, 264/109–128, 160

(56) References Cited

U.S. PATENT DOCUMENTS

| 3,375,311 A | * | 3/1968 | Franze |
| 3,376,187 A | * | 4/1968 | McKee, Jr. et al. |
| 3,461,016 A | * | 8/1969 | Irving, Jr. et al. |

FOREIGN PATENT DOCUMENTS

| DE | 4007763 A | * | 9/1991 |
| DE | 4339169 A | * | 5/1994 |
| EP | 0 227 029 | * | 7/1987 |
| EP | 0775 563 A2 | * | 5/1997 |
| JP | 54081211 | * | 6/1979 |
| JP | 02222447 | * | 8/1990 |

* cited by examiner

*Primary Examiner*—Stephen J. Lechert, Jr.
(74) *Attorney, Agent, or Firm*—Knobbe, Martens, Olson & Bear, LLP

(57) ABSTRACT

A method and apparatus for manufacturing a wire or cord for welding floor coverings, such as linoleum or artificial fiber floor covering. The wire or cord forms a fixed joint via thermal processes between separation edges of adjacent sections of floor coverings provided with colors and patterns such that minimal difference is apparent between the floor covering and the cord or wire. A mixture of colored granules is subjected to a process of mixing, heating, and cooling adapted to form solid sheets that are cut to form the cord or wire.

7 Claims, 1 Drawing Sheet

METHOD FOR MANUFACTURING A CORD FOR WELDING FLOOR COVERINGS

BACKGROUND OF THE INVENTION

1. Field of the Invention

The invention concerns a method and arrangement for manufacturing a wire or cord for welding floor covering, such as linoleum, or an artificial fibre floor covering, with colours and patterns, which filler wire forms a firm joint with the edges of the floor covering, which are placed beside one another, under the influence of a thermal process, all this in such a way that there is hardly any difference in colours and patterns between weld and floor covering.

2. Description of the Related Art

From the German patents specification 4339169 a filler wire is known, with which after welding the joint between the floor covering the distinction between the weld and multi-coloured floor covering had also entirely or almost entirely disappeared, so that the impression of an uninterrupted floor covering arises. However, the manufacturing of this filler wire takes place by multiple application of heat and pressure on the previously formed strips for the welding material, which renders this known method labour-intensive and inefficient.

SUMMARY OF THE INVENTION

The invention now introduces a method and arrangement with which the filler wire or cord can be obtained in a simple, efficient and reliable manner. To this aim, according to the invention, the method is characterised in that a mixture is made of coloured granules whether or not of a random grain form, which is transported to a heating system, where the mixture is subjected to a heat treatment in such a way that a molten and coloured mixture with a pattern arises, which is then further transported to a cooling system in which the mixture is cooled down into a sheet, which can be cut into filler wires or strips by a cutting machine.

Preferable is the method according to the invention, which is characterised in that the mixture is mainly formed by granules based on polymers to which suitable resins, kinds of wax and/or weakeners are added, where the polymers may consist of polyvinyl acetate, polyamide, polyethylene, polypropylene and polyvinyl chloride. Thanks to the size, form and distribution of the colours in the mixture, the desired filler wires can finally be cut from the fixed sheet.

There is an advantage in the application of the method in which the diameter or thickness of the granules is approximately between 0.1–10 mm and the granules have entirely random shapes, e.g. round, bar-shaped, polygonal oval, etc.

Another favourable circumstance is that heating of the mixture takes place between 50° and 350° C. Preferable here is the method that is characterised in that the mixture is transported to a heat resistant conveyor belt and is transported through the systems this way.

Optimal results are obtained when, according to the invention, on the conveyor belt the mixture is subjected to temperatures between approximately 50° and 220° C. at the top and between approximately 50° and 350° C. at the bottom.

A favourable result is obtained according to a method which is characterised in that the molten mixture is cooled down on the conveyor belt during a course of approximately 50°–0° C. In this manner an (inflexible) sheet, which reflects the desired colours and patterns, is obtained.

The arrangement for obtaining a filler wire or cord by the method according to the invention is mainly characterised by an endless, movable, heat resistant conveyor belt, at the end of which there is a funnel to catch, guide or mix the granules, where below the funnel a duct is used, which connects to the conveyor belt and beyond the transition from duct to conveyor belt means have been applied with which the granules that are transported on the belt can be spread over the width of the belt in an even thickness and near the means a heating system as well as, at some distance, a cooling system have been applied, along which the conveyor belt can be moved.

Preferable is the application of the arrangement according to the invention, which is characterised in that the means for evenly spreading the granules on the conveyor belt are mainly formed by an adjustable levelling element that is placed over the width of the belt, the bottom of which can level the mixture of granules in order to form an even top layer and layer thickness. It is also advantageous if connected to the funnel a vibrating duct is applied, so that an effective mixing can be achieved.

Advantageous is an application according to the invention which is characterised in that a conveyor belt, at least in its longitudinal direction, is provided with grooves the cross sections of which are mainly angular, trapezoidal, round U-shaped. By this measure a filler wire is efficiently obtained, which exactly fits in the joints between floor coverings placed next to each other, the sides or edges of which have straight, slanting, circular or bowed cross sections, respectively.

In a preferable application the heating system that is applied at some distance from the levelling means, is provided with adjustable heating elements, with which the top and/or bottom of the mixture that is present on the conveyor belt may be heated as desired, so that the desired stadium of molten granules is determined this way.

Preferable is the application which is characterised in that a cooling system is applied at some distance from the heating system, with which the molten mixture from the heating system can be cooled or moulded, respectively, into a fixed sheet.

Efficient is an application of the arrangement to which a cutting machine is connected, with which the multi-coloured and patterned sheet transported by the conveyor belt can directly be cut into cords of different lengths and cross-sections. This cutting machine can be equipped with a rotating knife or knives that swing to and fro, depending on the sheet material that is finally formed.

By the previously described measures the mixture of filler wire granules is effectively and reliably molten into a multi-coloured mixture, partly or completely as desired, and then cooled down into a fixed sheet, the colour and pattern of which practically correspond with that of the floor covering that must be welded. As mentioned before, a filler wire or cord can be cut from the sheet with a cutting machine. With a welding arrangement the filler wire can then be welded into the joint between floor coverings, in such a way that the joint is fully closed, so that on the one hand liquids, cleaning agent, etc, can not penetrate between the joint edge and the edge of the floor covering, on the other hand the effect of a fully similar floor covering that is laid without any interruptions arises.

For the sake of clarity we must also state that the filler wire is suitable for artificial fibre floor covering or floor covering that is mainly manufactured of natural raw materials, depending on the composition of the mixture.

DETAILED DESCRIPTION OF THE PREFERRED EMBODIMENT

Figure 1:
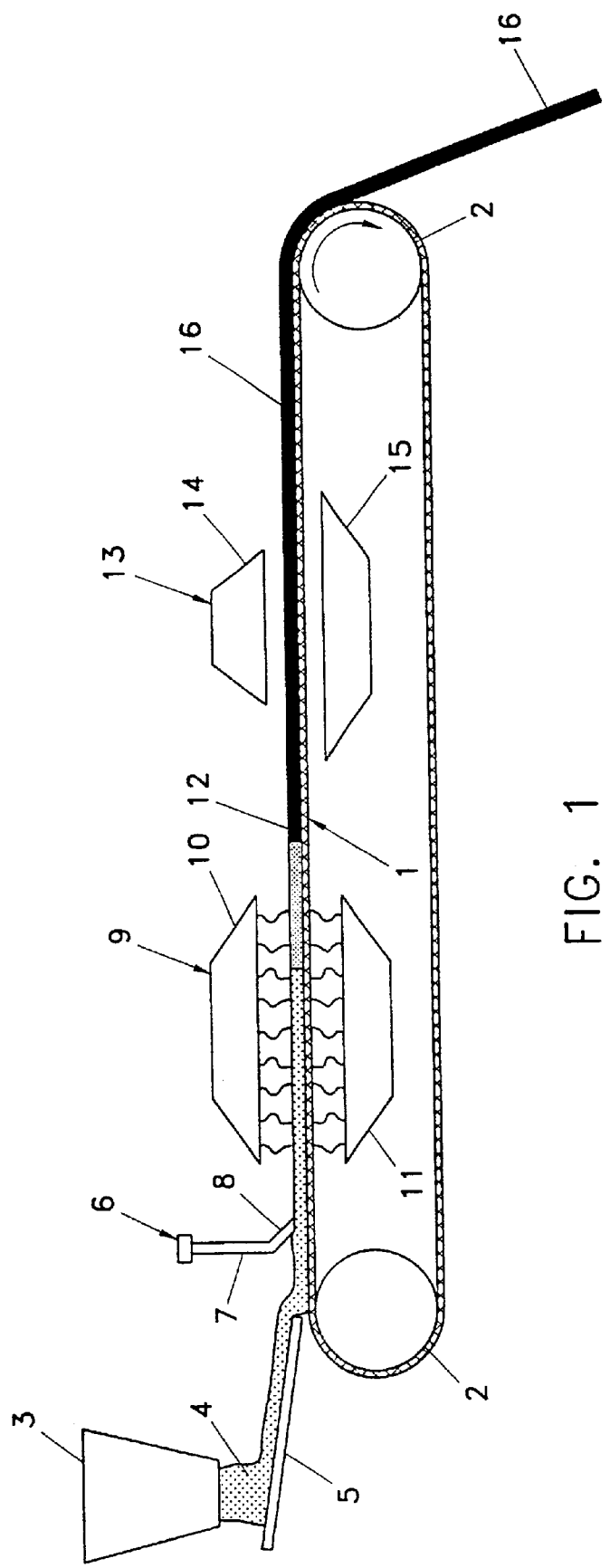
FIG. 1 is a side section view of an apparatus for manufacturing a cord for welding floor coverings.

The invention is hereafter further explained, by the illustration of an arrangement as is shown in the drawing, where features and other advantages will become clear. According to the invention, the arrangement comprises an endless conveyor belt manufactured of heat resistant material 1, which is driven via the rolls 2 and a motor (not in the drawing). On the left of the conveyor belt there is a funnel 3, in which filler wire granules 4 of various colours and where necessary of various shapes have been poured and which end up as a mixture on a vibrating duct 5 at the bottom of the funnel. As indicated before, the granules are formed of EVA—copolymers, to which a weakener, e.g. from the aliphatic and aromatic group has been added for a good effect.

It must be stated that the choice in the forms of the granules, which may be round, bar-shaped, oval, etc, as well as in their colours and the spreading of these granules on the conveyor belt, a mixture is obtained that finally produces a filler wire with the same colours and patterns as those of the floor covering.

From the vibrating duct 5, which is somewhat oblique, the mixture 4 ends up on the conveyor belt 1, over which according to the invention a levelling element 6 is applied. To this aim the element 6 comprises a screen 7, which is adjustable in height and stretches over the width of the belt 1. The bottom 8 is somewhat flexible, all this in such a way that the height or thickness of the mixture 4 transported on the belt 1 is influenced by this, and the effect is achieved that the top of the mixture 4 is leveled even. By this measure the following process, which is the melting of the mixture, becomes well controllable. This process takes place in heating system 9 through which the belt I can move. In this system 9 adjustable heating elements 10 and 11 have been applied for an effective melting process to this aim at least at the top and bottom of the belt 1. In this application form the temperature regulation preferably takes place between approximately 50° C.–350° C., where the regulation at the top takes place between approximately 50° C. to 220° C. and at the bottom between approximately 50° C.–350° C. After passing the heating system 9 the molten granular mixture 12 has been formed on the belt, which is transported through a cooling system 13 for the next processing stage. To this aim cooling element 14 or 15, respectively, may have been applied at the top and/or bottom of the belt 1, too. Here it is preferable to take the measure where the cooling takes place by convection or conduction with a cooling course of approximately 50°–0° C. According to the invention, this creates the effect that the liquid mixture 12, which comes from the system, is transformed into a solid form 16, where the colours and patterns are practically identical to those of the floor covering that is to be welded.

The mixture in sheet form 16 that is obtained can then be processed into filler wires of a certain thickness by a cutting machine (which is not shown) and rolled on to a reel. It must be observed that in a preferred embodiment the conveyor belt 1 may in its longitudinal direction be provided with grooves which, as explained before, may have variably-shaped cross sections. In such a finish a sheet 16 may then be obtained, the bottom of which is provided with bulges or ridges, which show the shapes of the grooves in cross section. The depth and width of a groove are preferably approx 0.5–5 mm. The filler wires cut from these often have a larger diameter than the groove between the floor coverings; however, by applying the specific melting process, this wire is partly molten into the groove, so that a full liquid and dust proof weld is obtained.

Anyway, filler wires with a square cross-section can be moulded into e.g. a round shape by means of an after treatment, such as a melting, planing or pressing technique, where necessary.

The invention, however, is not restricted to the arrangement as described above for the application of the method since the invention may also include an arrangement in which the mixture of granules is evenly spread on to a stationary belt, sheet or tray, after which a heating system and then a cooling system can move over the mixture at a certain speed, so that also a evenly formed fixed sheet provided with practically identical colours and patterns to those of the floor covering is obtained.

What is claimed is:

1. A method for manufacturing a filler cord for welding sections of floor coverings having colors and patterns via thermal processes wherein the filler cord is adapted to fill voids between adjacent sections of floor covering such that the sections of floor coverings are materially continuous and the colors and patterns are substantially continuous across adjacent sections of floor covering and the interposed filler cord comprising the steps of:

providing a mixture of colored granules;

transporting the mixture of colored granules to a heating system;

heating the mixture of colored granules such that the mixture becomes molten and comprises a pattern;

transporting the molten mixture comprising a pattern to a cooling system;

cooling the molten mixture so as to form a solid sheet; and cutting the solid sheet into a plurality of filler cords with a cutting machine.

2. The method of claim 1, wherein the colored granules are of random shape and have a diameter between 0.1 mm and 10 mm.

3. The method of claim 1, wherein the colored granules comprise at least one of polyvinyl acetate, polyamide, polyethylene, polypropylene, and polyvinyl chloride and wherein at least one of resin, wax, and weakeners is added to the colored granules.

4. The method of claim 1, wherein the heating takes place between 50°–350° C.

5. The method of claim 1, wherein transporting the mixture comprises transporting the mixture on a heat resistant conveyor belt.

6. The method of claim 5, wherein the heating takes place between 50°–220° C. at a top surface and at 50°–350° C. at a bottom surface.

7. The method of claim 1, wherein cooling takes place between 50°–0° C.

* * * * *